United States Patent [19]

Burgess

[11] Patent Number: 4,815,411

[45] Date of Patent: Mar. 28, 1989

[54] CONTAINER FOR CARRYING LIVE FISH

[76] Inventor: Dennis F. Burgess, P.O. Box 142, Henrietta, N.C. 28076

[21] Appl. No.: 111,655

[22] Filed: Oct. 23, 1987

[51] Int. Cl.⁴ ............................................... B63B 35/14
[52] U.S. Cl. .................................... 114/255; 114/343; 43/55; 43/57
[58] Field of Search ............... 43/55, 56, 57; 114/255, 114/343

[56] References Cited

U.S. PATENT DOCUMENTS

| | | | |
|---|---|---|---|
| 514,908 | 2/1894 | Burton | 114/352 |
| 2,680,424 | 6/1954 | Brown | 119/3 |
| 2,765,577 | 10/1956 | Scruggs | 43/55 |
| 2,936,542 | 5/1960 | Butler et al. | 43/57 |
| 2,966,002 | 12/1960 | Hobson et al. | 43/55 |
| 3,304,645 | 2/1967 | Hardesty et al. | 43/55 |
| 3,401,671 | 9/1968 | Axelrod et al. | 119/5 |
| 4,033,280 | 7/1977 | Wood et al. | 114/255 |

FOREIGN PATENT DOCUMENTS 2525  5/1894  United Kingdom ................ 114/255

Primary Examiner—Nicholas P. Godici
Assistant Examiner—Richard K. Seidel
Attorney, Agent, or Firm—Laurence R. Brown; Alfred J. Mangels

[57] ABSTRACT

A container for water to maintain fish within the container in a live condition. The container is of water impermeable construction, and includes a drain valve adjacent the bottom, and water inlet and outlet openings positioned in the side walls of the container. The container is adapted to be placed within a receptacle, which can be provided in the hull of a boat, the receptacle having corresponding water inlet and outlet openings positioned opposite the respective openings in the container so that water that enters the receptacle through the water inlet flows into the container, and excess water flows through the water outlet, so that fresh water is circulated through the container. The container can be removed for transporting the fish, or it can be used for weighing the fish after the water has been drained therefrom through the drain valve.

21 Claims, 4 Drawing Sheets

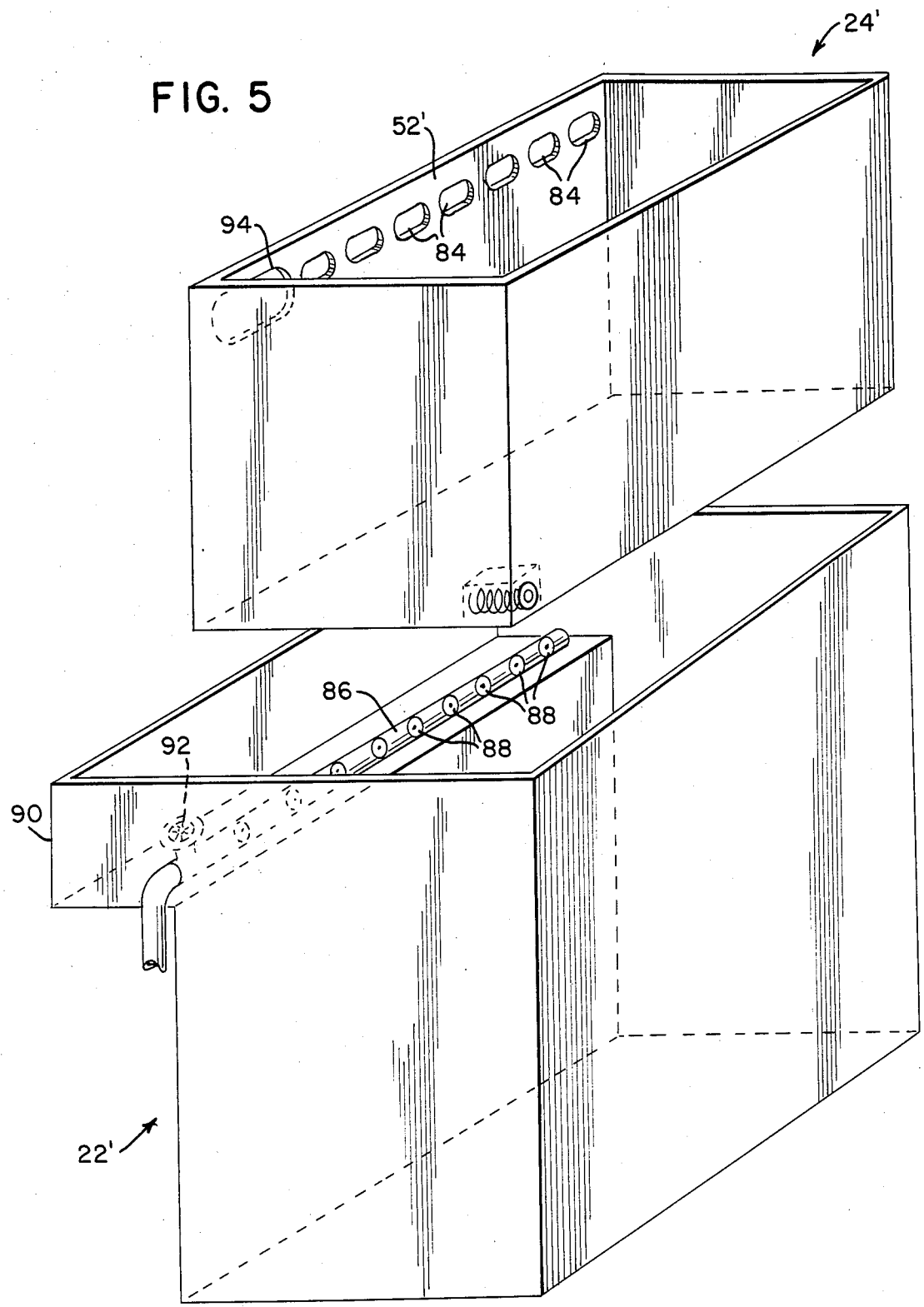

CONTAINER FOR CARRYING LIVE FISH

BACKGROUND OF THE INVENTION

1. Field of the Invention

This invention relates to containers, and more particularly to a container for carrying live fish in water, and adapted to be carried in a well in a fishing boat.

2. Description of the Related Art

Fishermen desire that fish that are caught be maintained in live condition as long as possible to reduce spoilage or deterioration of the meat. Likewise, sport fishermen who do not intend to eat their catch desire to maintain the catch alive so that the fish can be returned to the body of water from which they were caught. Heretofore, a common method for keeping such fish alive was to place them on a stringer and to allow the fish to remain submerged in the body of water and on the stringer, with the end of the stringer connected to the fishing boat. However, that method could possibly lead to injury of the fish as a result of the stringer passing through the gills and mouth of the fish.

Another method of keeping caught fish alive is to provide a submersible creel that is submerged in the water, and is in the form of a perforated enclosure. An example of such a device is shown in U.S. Pat. No. 2,765,577, which issued Oct. 9, 1956, to E.P. Scruggs.

Another technique for maintaining caught fish in a live condition is shown in U.S. Pat. No. 3,304,645, which issued Feb. 21, 1967, to R. D. Hardesty et al. In that patent a live bait and fish container is disclosed in the form of a container that is at least partially filled with water to contain fish, and is adapted to float in the water adjacent to a boat and to be tied to the boat so it can be pulled along with it.

Even though the devices that have heretofore been developed can help to maintain the fish in a live state while the fisherman continues to fish, where the fisherman is participating in a fishing contest, in which it is usually required that the fish that are caught be kept alive, weighed, and then returned alive to the body of water from which they are taken, each fish must individually be removed from a stringer or a submerged creel for weighing. Oftentimes the fish are placed in plastic bags partially filled with water in an effort to keep the fish alive. However, in the course of removing the fish from a stringer or retrieving it from a live well, injury is sometimes caused to the fish, and that injury sometimes kills the fish. In tournament fishing, dead fish could result in a penalty being imposed against the fisherman. Further, the fish in the plastic bags must be carried to the scales, the water must then be released from the bag, and the fish weighed on the scale. Then, after the weighing has been completed, the fish are again placed in the plastic bags for carrying back to the body of water so that they can be released.

The above-described methods are cumbersome, and also lead to dead or injured fish. Accordingly, it is an object of the present invention to overcome the problems described above, and to provide an improved fish container and carrier that is particularly adapted to keeping the fish alive, and to permit them to be conveniently carried to a weighing scale and thereafter to be returned to the body of water from which they were taken, all without injury to the fish.

SUMMARY OF THE INVENTION

Briefly stated, in accordance with one aspect of the present invention, a container is provided for carrying fish in water in order to keep the fish alive and to avoid injury to them. The container includes a tank having at least one water impermeable side wall, a water impermeable bottom wall, and a carrier to permit the container to be conveniently carried. A pair of openings are provided in the side wall and are spaced above the bottom wall a distance sufficient to permit a desired level of water to be maintained within the container. The openings permit water to be admitted to and removed from the container, as desired, to provide circulation of fresh water. Drain means are provided adjacent to the bottom wall to selectively permit draining of the water from within the tank.

In accordance with another aspect of the present invention, a container of the type described immediately above is received in a receptacle forming part of a fishing boat, the receptacle extending downwardly from the deck of the boat to define a well for receiving the container. The well is adapted to receive the container and to contain water. The well includes water inlet means and water outlet means, each of which is positioned opposite respective openings in the container side walls to permit the introduction into the well and into the container of fresh water through one of the sets of openings and to withdraw water through the other sets of openings to thereby permit circulation of fresh water to keep alive the fish that are in the container. The container is removable from the well and can be carried to a weigh scale if desired.

BRIEF DESCRIPTION OF THE DRAWINGS

FIG. 5 is a perspective view of another embodiment of a fish container in accordance with the present invention and a corresponding receptacle that can be provided in a boat in the manner illustrated in FIGS. 1 and 2.

DESCRIPTION OF THE PREFERRED EMBODIMENTS

Figure 1:
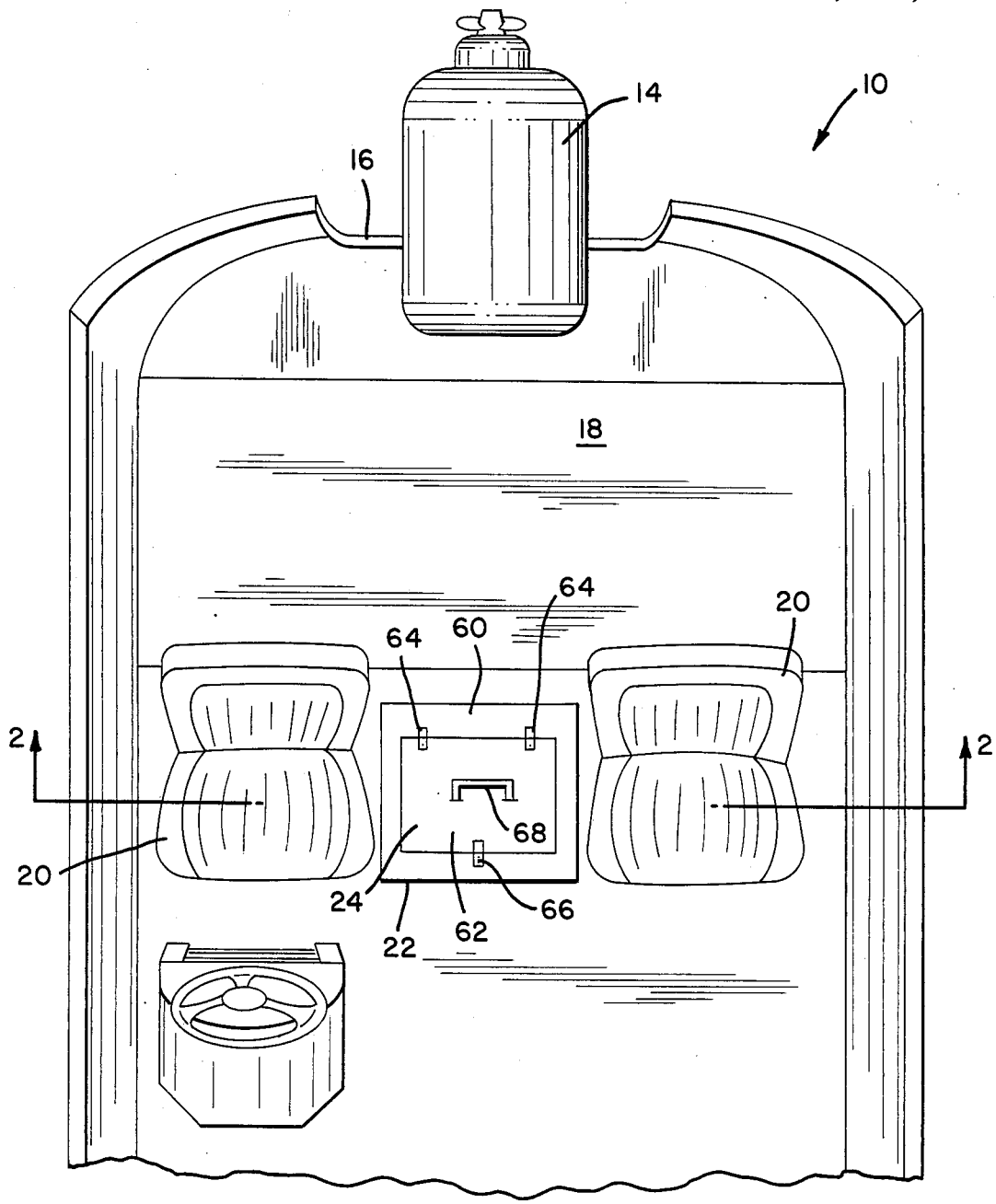
FIG. 1 is a fragmentary top view showing a portion of the deck and seating area of a fishing boat, the boat including a fish container in accordance with the present invention.

Referring now to the drawings, and particularly to FIG. 1 thereof, there is shown a portion of a fishing boat 10 including a hull 12 that supports a motor 14 on a transom 16 at the rear portion of the hull. The boat includes a deck portion 18 in which two seats 20 are recessed, the left seat being for the boat operator. Between the seats is a well 22 in which a container 24 in accordance with the present invention is received. Well 22 is defined by a recess in deck 18.

Figure 2:
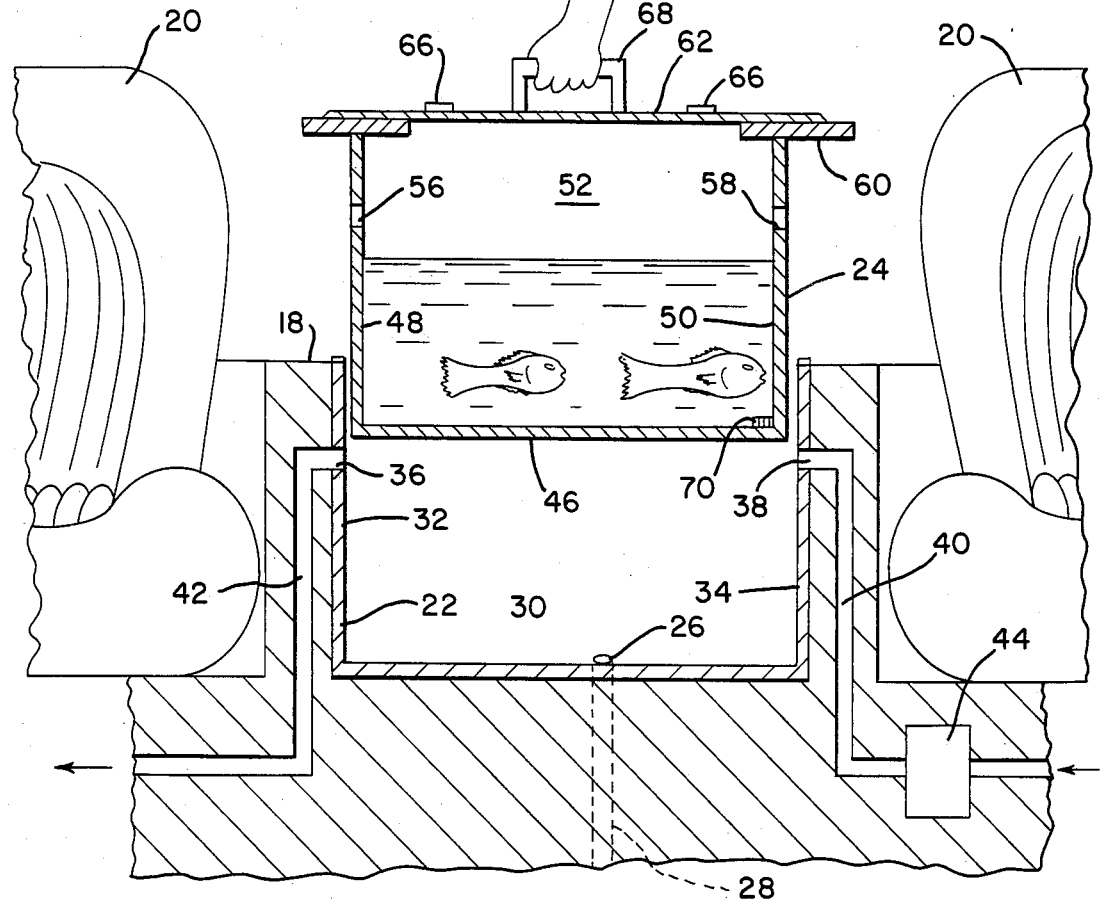
FIG. 2 is a fragmentary, transverse cross-sectional view taken along the line 2—2 of FIG. 1 and showing the removal from the boat of a container in accordance with the present invention.

As best seen in FIG. 2, well 22 is a water tight compartment that includes a selectively closable and openable drain aperture 26 to permit the draining through drain pipe 28 of water contained within the well. Drain aperture 26 is provided in the bottom wall 30 of the well, and two of the opposed rectangular side walls 32, 34 of the well include openings 36, 38, respectively. Opening 38 defines a water inlet opening to admit water to the well, and opening 36 defines a water outlet opening to permit excess water to flow from the well so the well does not overflow. Water inlet 38 communicates with a suitable inlet conduit 40 that, in turn, communicates with the body of water in which the boat is floating, conduit 40 being so arranged that upon forward motion of the boat water flows into the conduit and then into the well. Excess water flows from the well through outlet 36 and outlet conduit 42. Also shown in FIG. 2 is a pump 44 that can be positioned in inlet conduit 40, to assist in bringing fresh water into the well.

Removably received within well 22 is container 24 that preferably conforms in shape with the shape of the well. Container 24 includes a water impermeable bottom wall 46, a first pair of opposed, water impermeable side walls 48, 50, and a second pair of opposed, water impermeable side walls 52, 54, only one of the pattern of which is visible in FIG. 2. Side walls 48 and 50 include respective openings 56, 58 that are aligned with and positioned opposite respective openings 36 and 38 in well 22. Container 24 includes a top wall 60 that extends outwardly from the side walls to define an outwardly extending peripheral lip that is adapted to rest against deck 18 at the top surface of the well. Additionally, as best seen in FIG. 1 a rectangular cover 62 is hingedly connected with top wall 60 by a pair of hinges 64 along one edge of the cover, and a closure 66 is provided along the opposite edge to engage with a cooperating closure portion, which can be a loop closure, or any other known type, which would be appreciated by those skilled in the art. Additionally, cover 62 includes a carrying handle 68 to permit the container to be lowered into and removed from the well, and also to be carried from the boat.

Figure 3:
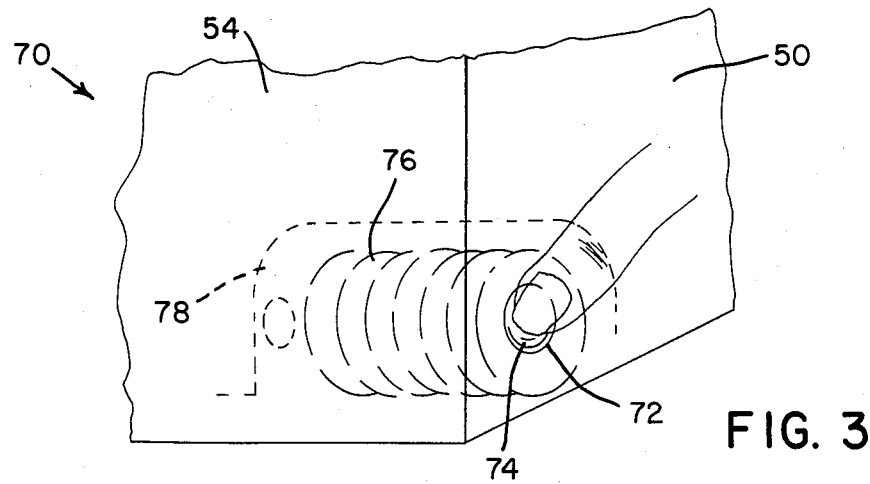
FIG. 3 is a fragmentary perspective view of a corner of a container in acordance with the present invention, and showing the structure of a water drain valve in a side wall of the container.

As best seen in FIGS. 2 and 3, container 24 includes a drain valve 70 adjacent bottom wall 46, and positioned opposite a drain opening 72 provided in side wall 50. Drain valve 70 is in the form of a ball 74 that has a diameter greater than the diameter of drain opening 72, and a compression spring 76, one end of which bears against ball 74. The other end of spring 76 bears against a fixed stop 78 within the container. The end of spring 76 that bears against the ball urges it toward drain opening 72 to close the opening and thereby retain water in container 24. Although the ball valve arrangement illustrated and described is preferred from the standpoint of simplicity, it would be apparent to those skilled in the art that other valving arrangments could also be provided, if desired.

In operation, container 24 is placed in well 22, and water is introduced into well 22 through inlet conduit 40 to fill the well with fresh water to the level of water outlet 36. Water also enters container 24 through opening 58 to provide a desired level of fresh water therein. As the fisherman catches fish, the fish are deposited in the water in container 24, and are maintained in a fresh, live condition by the circulation of fresh water from the body of water through water inlet 38 on a substantially continuous basis, due either to the forward movement of the boat, or by virtue of the operation of pump 44, to thereby provide fresh water to the container to replace the oxygen-depleted water that would otherwise be present in the container, and to thereby maintain the fish in a live condition. Excess water flows out through opening 56, water outlet 36, and outlet conduit 42 to be returned to the body of water. Thus, a continuous supply of fresh, oxygenated water is provided.

Figure 4:
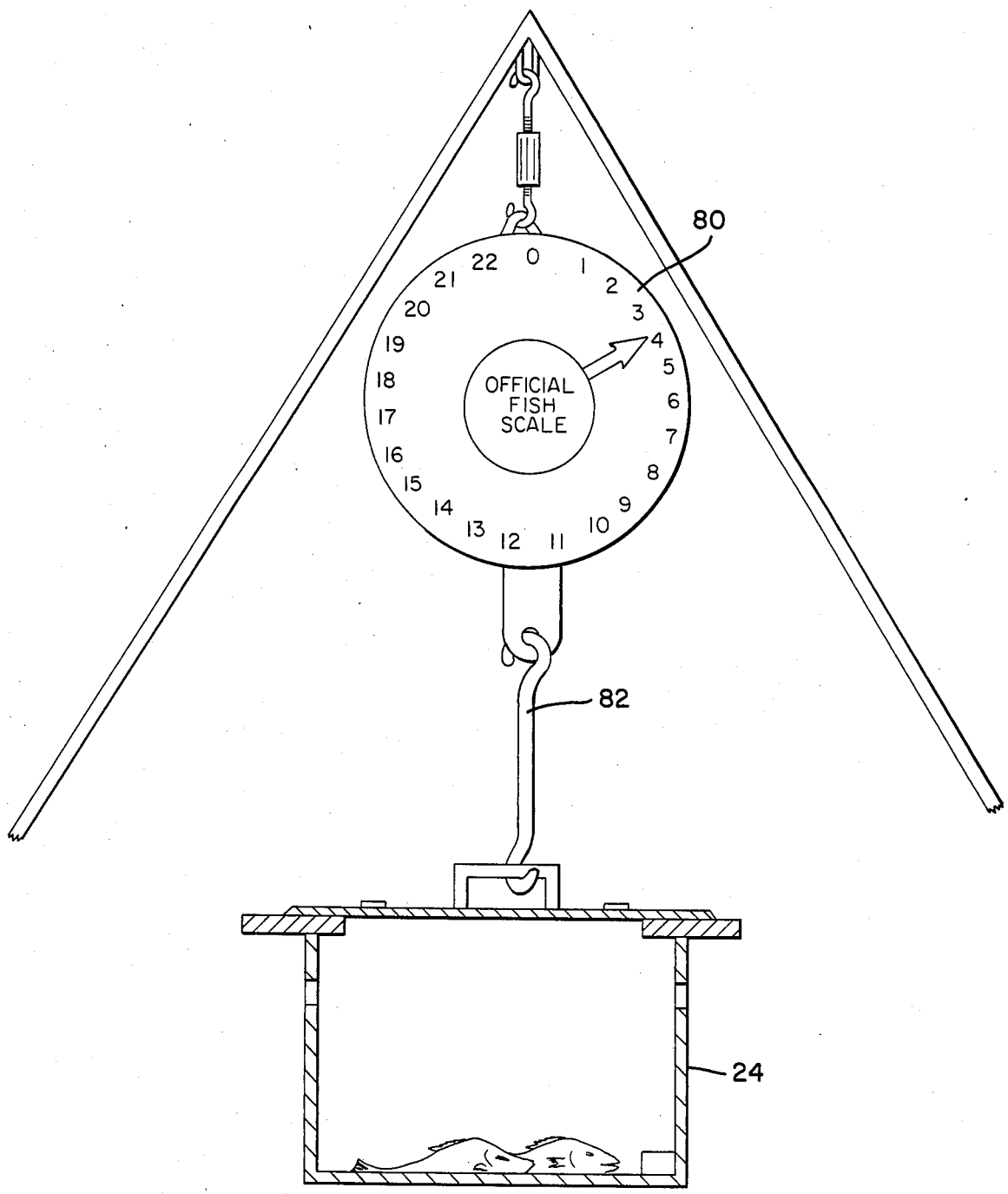
FIG. 4 shows the fish container shown in FIG. 2 supported on a fish weigh scale.

At the end of the fishing day, container 24 is removed from the boat, as shown in FIG. 2, after which the water in well 22 can be removed through drain 26. At that point the fish can either be returned to the body of water from which they were taken, they can be carried to a place where they can be prepared for later or immediate consumption, or they can be taken to a weigh station to be weighed, as shown in FIG. 4. The weigh station includes a scale 80 that is adapted to support container 24 from a hook 82, or the like, and the weight of the fish is determined by pressing inwardly on the ball in drain valve 70 to release the water from within the container, and the combined weight of the fish and container is then determined. Because the weight of the container is known, the weight of the fish can be readily ascertained. Thereafter, the fish can readily be returned to the body of water once again to provide additional sport for other fisherman.

Another container and well embodiment is illustrated in FIG. 5. For convenience of illustration, container 24' is shown with the top wall and cover removed. In overall form, the embodiment of FIG. 5 is similar to the embodiment illustrated in FIGS. 2, 3, and 4, except that along one side wall 52' of container 24' a series of spaced, aligned openings 84 are provided and are opposite a sprinkler pipe 86 that includes a series of spaced discharge openings 88 when container 24' is positioned in well 22. Sprinkler pipe 86 is positioned in a lateral offset 90 in well 22'. A control valve 92 is provided in sprinkler pipe 86 to control the flow of water through opening 88. Container 24' includes an enlarged opening 94 in side wall 52' opposite control valve 92 to permit a person's hand to pass therethrough and thereby permit access to the control valve. As shown in FIG. 5, lateral offset 90 is positioned adjacent the upper edge of well 22'. Sprinkler pipe 86 provides an alternative method of adding aerated water to container 24' to prolong the life of the fish therein.

Although particular embodiments of the present invention have been illustrated and described, it would be apparent to those skilled in the art that various changes can be made without departing from the spirit of the present invention. It is therefore intended to encompass within the appended claims all such changes and modifications that fall within the scope of the present invention.

What is claimed is:

1. A fishing boat comprising:
   (a) a boat including a hull;
   (b) deck means supported by the hull to define an interior space between the deck means and the hull;
   (c) receptacle means formed in and extending downwardly from the deck means into the interior space for defining a well for removably receiving a tank means;
   (d) tank means for holding and receiving water and fish, the tank means having cross-sectional configuration corresponding substantially with that of the receptacle means and removably receivable in the receptacle means, the tank means including a water impermeable side wall having an inlet opening therethrough for admitting fresh water thereto and having an outlet opening therethrough spaced from the first opening for releasing water that exceeds a predetermined height; and (e) the receptacle means including water inlet means and water outlet means positioned for conveying fresh water to and from the tank means through the inlet and outlet openings, respectively, in the tank means.

2. A fishing boat in accordance with claim 1, wherein the water inlet means is positioned opposite the inlet opening in the tank means for admitting fresh water into the tank means, and the water outlet means is positioned opposite the outlet opening in the tank means for conveying water from the tank means.

3. A fishing boat in accordance with claim 1, wherein the water inlet means is in communication with a body of water in which the boat is floating.

4. A fishing boat in accordance with claim 3, wherein the water inlet means includes pump means for pumping water from the body of water into the receptacle means.

5. A fishing boat in accordance with claim 3, wherein the water inlet means includes a inlet positioned below the water level outside the boat and positioned facing the direction of the boat movement when the boat is proceeding in a forward direction to receive and convey water into the receptacle means by forward movement of the boat.

6. A fishing boat in accordance with claim 1, wherein the water outlet means is in communication with the body of water in which the boat is floating.

7. A fishing boat in accordance with claim 6, wherein the water outlet means includes an outlet positioned below the water level outside the boat and positioned facing opposite to the direction of boat movement when the boat is proceeding in a forward direction, to withdraw excess water from the receptacle means.

8. A fishing boat in accordance with claim 1, wherein the tank means includes a bottom wall and a normally closed valve means positioned within the tank means and adjacent the bottom wall for selectively draining water from the tank means when the tank means is removed from the receptacle means.

9. A fishing boat in accordance with claim 1, wherein the receptacle means includes normally closed drain means for draining water from the receptacle means.

10. A fishing boat in accordance with claim 1, wherein the receptacle means includes sprinkler means connected with a source of water and positioned opposite a sidewall of the tank means for sprinkling water into the tank means.

11. A fishing boat in accordance with claim 10, wherein the sprinkler means includes control valve means for controlling the rate of water flow through the sprinkler means.

12. A fishing boat in accordance with claim 10, wherein the sprinkler means includes an elongated sprinkler tube having a plurality of discharge openings facing the tank means, and the tank means includes a plurality of openings opposite the sprinkler discharge openings to permit flow of water from the sprinkler means into the tank means.

13. A fishing boat in accordance with claim 10, wherein the tank means includes hand opening means in the sidewall thereof and positioned opposite the control valve means when the tank means is positioned within the receptacle means, to permit manual operation of the control valve means through the tank means.

14. A fishing boat in accordance with claim 13, wherein the sprinkler means is carried in an offset extending laterally outwardly from the receptacle means and adjacent an upper edge of the receptacle means.

15. A fishing boat in accordance with claim 1, wherein the boat includes a pair of spaced seats for fisherman, and the receptacle means is positioned in the space between the pair of seats.

16. A live well for storing fish in live condition within a quantity of water, said live well comprising:

(a) an inner container for holding and receiving water and fish, the inner container including a water impermeable bottom wall and an upwardly extending water impermeable sidewall, the sidewall including a first opening therethrough for admitting fresh water into the inner container, a second opening therethrough for releasing excess water from the inner container, a drain opening adjacent the bottom wall, and manually operable valve means within the inner container for selectively releasing water from the inner container through the drain opening; and (b) an outer container corresponding in cross-sectional shape with that of the inner container for removably receiving the inner container, the outer container being water impermeable and including a water inlet opening and a water outlet opening positioned opposite respective ones of the first and second openings of the inner container when the inner container is positioned within the outer container.

17. A live well in accordance with claim 16, wherein the outer container is defined by a recess in the deck of a boat and is adapted to support and removably receive the inner container.

18. A live well in accordance with claim 17, including means for circulating water into and out of the inner container, said circularing means including first aperture means in the outer container for admitting water thereinto and second aperture means in the outer container for permitting water to flow therefrom, and first aperture means in the inner container positioned opposite the first aperture means in the outer container when the containers are in nested relationship, and second aperture means in the inner container and opposite the second aperture means in the outer container when the containers are in nested relationship.

19. A container for carrying live fish in water, said container comprising:

(a) a tank having at least one side wall, a bottom wall, and a carrying means, a pair of openings in the side wall above the bottom wall for permitting fresh water to enter into and exit from the tank through an inlet opening and an outlet opening, respectively, and spaced above the bottom wall a distance sufficient to permit water to remain in the container at a predetermined depth; and (b) drain opening means adjacent the bottom wall to selectively permit draining of water from within the tank, said drain opening means including a drain opening in the side wall and a drain valve positioned within the container and comprising a closure means having a size greater than that of the drain opening to prevent flow of water through the drain opening when the closure means is against the opening, and spring means in contact with the closure means to urge the closure means against the drain opening, the spring means having a resistance sufficient to permit manual movement of the closure means by finger pressure applied from outside the container in an inward direction relative to the side wall to shift the closure means inwardly and away from the drain opening to selectively permit water to be drained from the container.

20. A container in accordance with claim 19, wherein the inlet and outlet openings are opposite each other.

21. A container in accordance with claim 19, wherein the container is of rectangular cross-section defined by two pairs of opposed, substantially parallel side walls, and the inlet and outlet openings are provided in each of one pair of opposed side walls.

* * * * *